US011037354B1

(12) United States Patent
Jones et al.

(10) Patent No.: US 11,037,354 B1
(45) Date of Patent: Jun. 15, 2021

(54) CHARACTER JOINT REPRESENTATION

(71) Applicant: Apple Inc., Cupertino, CA (US)

(72) Inventors: Scott R. Jones, San Rafael, CA (US); Brady Parell, San Mateo, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/750,604

(22) Filed: Jan. 23, 2020

Related U.S. Application Data

(60) Provisional application No. 62/805,358, filed on Feb. 14, 2019.

(51) Int. Cl.
*G06T 13/40* (2011.01)
*G06T 19/20* (2011.01)
*G06T 17/10* (2006.01)

(52) U.S. Cl.
CPC .............. *G06T 13/40* (2013.01); *G06T 17/10* (2013.01); *G06T 19/20* (2013.01); *G06T 2219/2016* (2013.01)

(58) Field of Classification Search
CPC ......... G06T 7/149; G06T 11/00; G06T 11/20; G06T 13/00; G06T 13/20; G06T 13/40; G06T 13/80; G06T 15/00; G06T 15/08; G06T 17/00; G06T 17/10; G06T 19/00; G06T 19/20; G06T 2219/2016
USPC ........................................................ 345/419
See application file for complete search history.

(56) References Cited

U.S. PATENT DOCUMENTS

| 8,498,846 | B2 | 7/2013 | Xu et al. |
| 9,424,378 | B2 | 8/2016 | McDaniel |
| 2009/0153553 | A1* | 6/2009 | Kim ........................ G06T 13/40 345/419 |
| 2010/0259546 | A1* | 10/2010 | Yomdin .................... G06T 7/12 345/473 |
| 2017/0032579 | A1* | 2/2017 | Eisemann ............. G06T 17/205 |
| 2017/0221250 | A1* | 8/2017 | Aguado .................. G06T 13/40 |
| 2019/0156545 | A1* | 5/2019 | Horn ....................... G06T 13/20 |
| 2020/0098177 | A1* | 3/2020 | Ni .............................. G06T 7/50 |

OTHER PUBLICATIONS

Shao, Wei and Victor Ng-Thow-Hing, "A General Joint Component Framework for Realistic Articulation in Human Characters", Association for Computing Machinery, Inc., Apr. 27, 2003; pp. 1-9.

\* cited by examiner

*Primary Examiner* — Sae Won Yoon
(74) *Attorney, Agent, or Firm* — Thompson Hine LLP

(57) ABSTRACT

Some implementations involve, on a computing device having a processor and a memory, creating a model of a jointed 3D asset that includes at least one joint that connects a first object to a second object, where a first end of the first object connects to a surface of a deformable coupler such that the first object is capable of rotating relative to the second object, and a second end of the second object connects to the surface of the deformable coupler such that the second object is capable of rotating relative to the first object. In various implementations, applying a motion to the model of the jointed 3D asset deforms the deformable coupler to allow translation of the first object with respect to the second object while allowing the first object and second object to rotate.

20 Claims, 13 Drawing Sheets

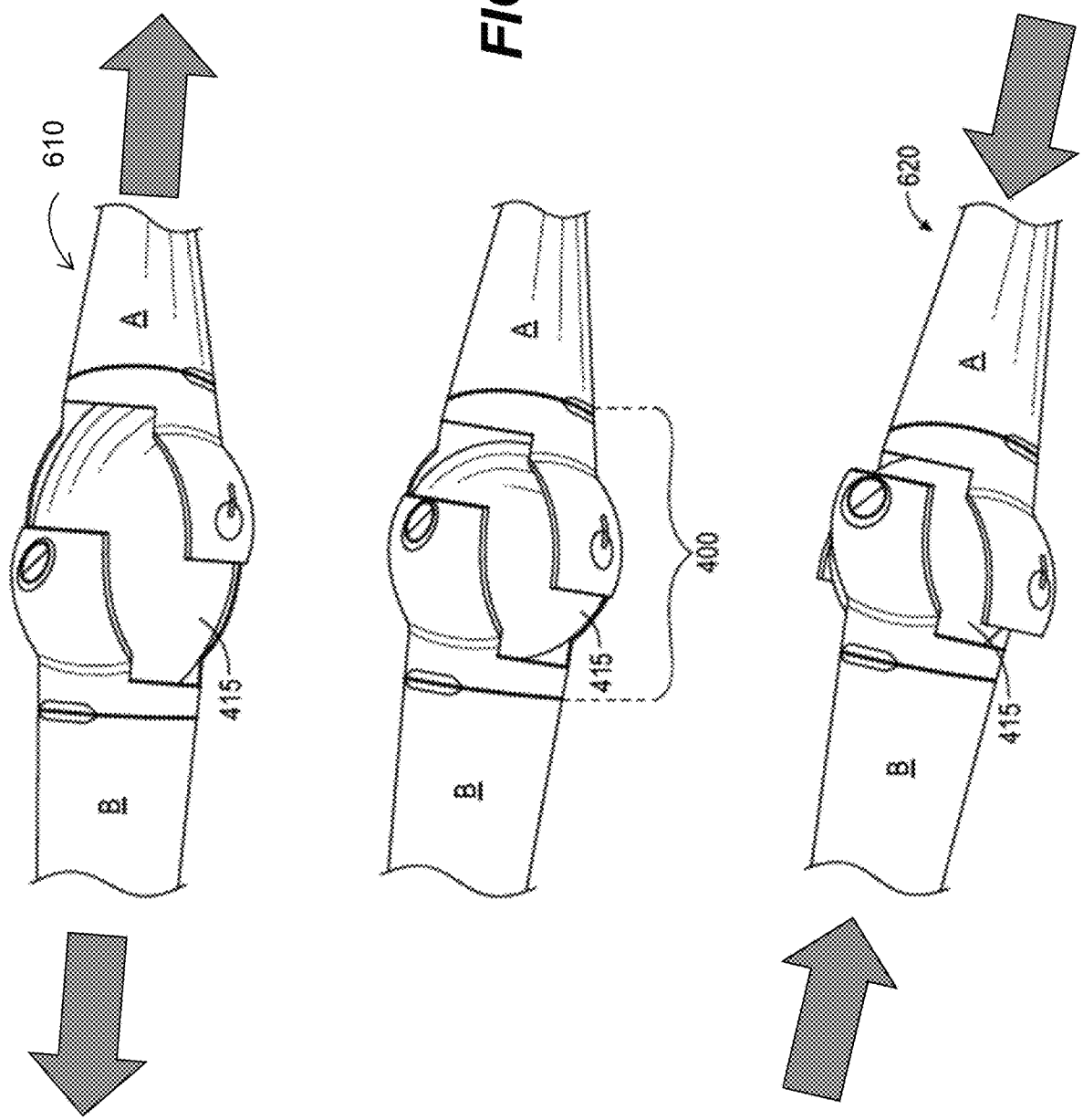

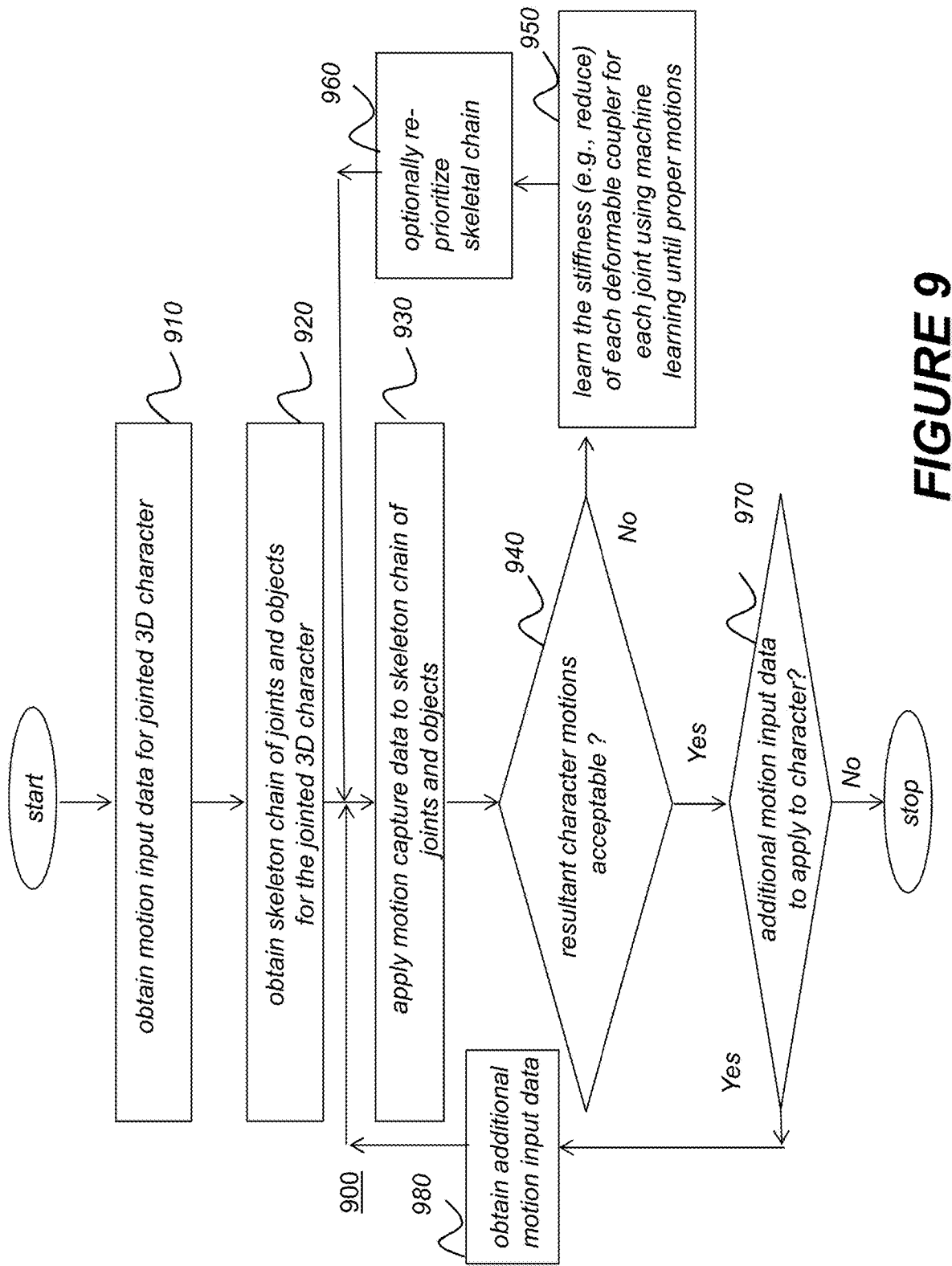

CHARACTER JOINT REPRESENTATION

CROSS-REFERENCE TO RELATED APPLICATION

This Application claims the benefit of U.S. Provisional Application Ser. No. 62/805,358 filed Feb. 14, 2019, which is incorporated herein in its entirety.

TECHNICAL FIELD

The present disclosure generally relates to models of jointed 3D animated assets, and in particular, to systems, methods, and devices for providing a universal joint for jointed 3D animated assets.

BACKGROUND

Using various rigid joint models can make generating desired movements for virtual 3D animated characters very difficult or time consuming.

SUMMARY

Various implementations disclosed herein include devices, systems, and methods that enable improved joint representation for jointed 3D assets such as animated characters or animated objects. In some implementations, an electronic device having a processor implements a method to create a model of a character including a deformable portion for a six degrees of freedom (DOF) of movement joint so that attached objects, limbs, or extremities can slightly translate along each three orthogonal axes at the joint. For example, in a computer generated reality (CGR) environment, a 3D content creator or other user may use one or more of such compressible universal joints in a skeleton of jointed 3D animated assets to provide more realistic movement.

Various implementations disclosed herein include devices, systems, and methods that provide a deformable universal joint for a jointed 3D animated asset, for example, for a CGR experience. In some implementations, an electronic device includes a digital model to move or visualize joints (e.g., skeletal) throughout an animated character. The digital model is a deformable universal joint capable of providing six DOF of movement. In some implementations, a compressible/expandable sphere provides the deformable characteristics (e.g., squishiness) of a deformable component of the deformable universal joint. In various implementations, detectable markings on both a first object and a second object connected by the deformable universal joint provide translational or positional movement information.

In various implementations, a digital model of a character is created including a joint that connects a first object to a second object. For example, the joint in the character can connect bone-like structures or representative objects like cylinders. In various implementations, a first end of the first object connects to a surface of a deformable coupler (e.g., a compressible or expandable (squishy) ball) such that the first object is capable of rotating (e.g., translating) relative to the deformable coupler. The rotation of the first object provides a first DOF of movement at the joint. In some implementations, the first object includes a forked end around part of the deformable coupler to secure the first end to the deformable coupler while allowing the first end to rotate relative to a center of the deformable coupler. The rotation of the first object relative to the center of the deformable coupler provides a second DOF of movement at the joint. In some implementations, the first end also rotates relative to the rest of the first object to provide a third DOF of movement at the joint.

In various implementations, a second end of the second object connects to a surface of a deformable coupler (e.g., a compressible or expandable (squishy) ball) such that the second object is capable of rotating (e.g., translating) relative to the deformable coupler. The rotation of the second object provides a first DOF of movement at the joint. In some implementations, the second object includes a forked end around part of the deformable coupler to secure the second end to the deformable coupler while allowing the second end to rotate relative to a center of the deformable coupler. The rotation of the second object relative to the center of the deformable coupler provides a second DOF movement at the joint. In some implementations, the second end also rotates relative to the rest of the second object to provide a third DOF of movement at the joint.

In various implementations, the deformable portion of the joint (e.g., deformable coupler) deforms (e.g., compresses or expands) to allow translation of the first object with respect to the second object while allowing the first object and second object to rotate like a universal joint (e.g., move with six DOF of movement). In some implementations, the translation or rotation of the first object relative to the second object results from motion of the digital model of the character. In some implementations, the deformable coupler deforms (e.g., the squishy ball changes size or shape to bring the first object and the second object closer to or farther from one another while also allowing the objects to rotate) so that the joint provides 6 DOF of movement while also providing translation along one, two, or three orthogonal axes between the first object and the second object.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a diagram that shows expansion and contraction of an example deformable coupler of a joint in accordance with some implementations.

FIG. 9 is a flowchart illustrating an exemplary method of machine learning the elasticity of a deformable joint (e.g., stiffness of the ball or deformable coupler 415) using input character motion data.

Figure 1:
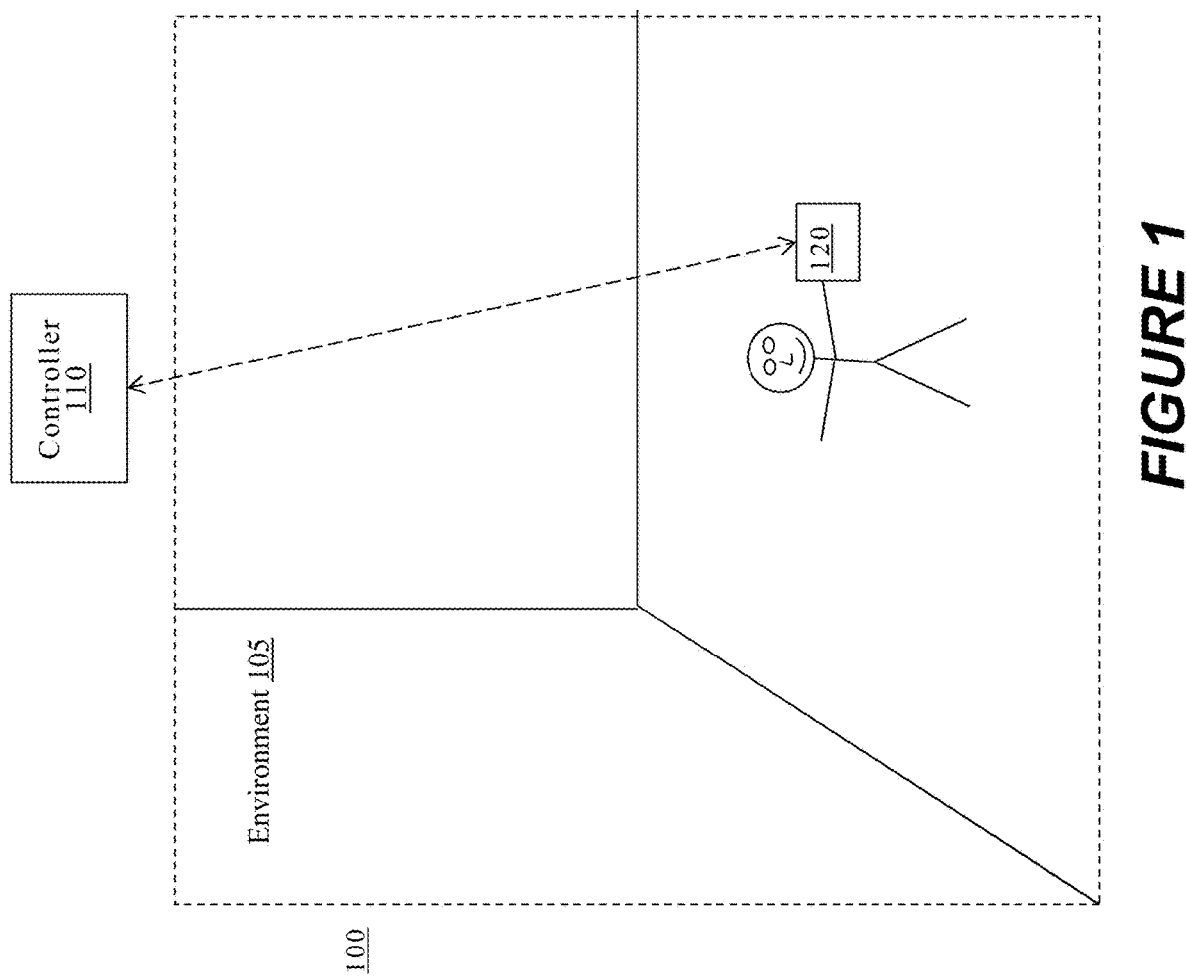
FIG. 1 is a block diagram of an example environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a world that individuals can sense or with which individuals can interact without assistance of electronic systems. Physical environments (e.g., a physical forest) include physical objects (e.g., physical trees, physical structures, and physical animals). Individuals can directly interact with or sense the physical environment, such as through touch, sight, smell, hearing, and taste.

In some implementations, the controller 110 is configured to manage and coordinate a CGR environment for the user (e.g., content creator). In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the electronic device 120 is configured to present the CGR environment to the user (e.g., content creator). In some implementations, the electronic device 120 includes a suitable combination of software, firmware, or hardware. The electronic device 120 is described in greater detail below with respect to FIG. 3. In some implementations, the electronic device 120 is a head mounted device (HMD). In some implementations, the functionalities of the controller 110 are provided by or combined with the electronic device 120.

According to some implementations, the electronic device 120 presents a CGR environment to the user while the user is present within the physical environment 105. In contrast to the physical environment, a CGR environment refers to an entirely or partly computer-created setting that individuals can sense or with which individuals can interact via an electronic system. In the CGR environment, a subset of an individual's movements is monitored, and, responsive thereto, one or more attributes of one or more virtual objects in the CGR environment is changed in a manner that conforms with one or more physical laws. For example, a CGR system may detect an individual walking a few paces forward and, responsive thereto, adjust graphics and audio presented to the individual in a manner similar to how such scenery and sounds would change in a physical environment. Modifications to attribute(s) of virtual object(s) in a CGR environment also may be made responsive to representations of movement (e.g., audio instructions).

An individual may interact with or sense a CGR object using any one of his senses, including touch, smell, sight, taste, and sound. For example, an individual may interact with or sense aural objects that create a multi-dimensional (e.g., three dimensional) or spatial aural setting, or enable aural transparency. Multi-dimensional or spatial aural settings provide an individual with a perception of discrete aural sources in a multi-dimensional space. Aural transparency selectively incorporates sounds from the physical environment, either with or without computer-created audio. In some CGR environments, an individual may interact with or sense only aural objects.

One example CGR environment is virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

Another example CGR environment is mixed reality (MR). A MR setting refers to a simulated setting that is designed to integrate computer-created sensory inputs (e.g., virtual objects) with sensory inputs from the physical environment, or a representation thereof. On a reality spectrum, a mixed reality setting is between, and does not include, a VR setting at one end and an entirely physical environment at the other end.

In some MR settings, computer-created sensory inputs may adapt to changes in sensory inputs from the physical environment. Also, some electronic systems for presenting MR settings may monitor orientation or location with respect to the physical environment to enable interaction between virtual objects and real objects (which are physical objects from the physical environment or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical environment, or a representation thereof. For example, an electronic system may have an opaque display and at least one imaging sensor for capturing images or video of the physical environment, which are representations of the physical environment. The system combines the images or video with virtual objects, and displays the combination on the opaque display. An individual, using the system, views the physical environment indirectly via the images or video of the physical environment, and observes the virtual objects superimposed over the physical environment. When a system uses image sensor(s) to capture images of the physical environment, and presents the AR setting on the opaque display using those images, the displayed images are called a video pass-through. Alternatively, an electronic system for displaying an AR setting may have a transparent or semi-transparent display through which an individual may view the physical environment directly. The system may display virtual objects on the transparent or semi-transparent display, so that an individual, using the system, observes the virtual objects superimposed over the physical environment. In another example, a system may comprise a projection system that projects virtual objects into the physical environment. The virtual objects may be projected, for example, on a physical surface or as a holograph, so that an individual, using the system, observes the virtual objects superimposed over the physical environment.

An augmented reality setting also may refer to a simulated setting in which a representation of a physical environment is altered by computer-created sensory information. For example, a portion of a representation of a physical environment may be graphically altered (e.g., enlarged), such that the altered portion may still be representative of, but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical environment may be altered by graphically obscuring or excluding portions thereof.

Another example of mixed reality is augmented virtuality (AV). An AV setting refers to a simulated setting in which a computer-created or virtual setting incorporates at least one sensory input from the physical environment. The sensory input(s) from the physical environment may be representations of at least one characteristic of the physical environment. For example, a virtual object may assume a color of a physical object captured by imaging sensor(s). In another example, a virtual object may exhibit characteristics consistent with actual weather conditions in the physical environment, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various CGR environments. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical environment, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical environment (e.g., onto a physical surface or as a holograph). Other examples of CGR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 2:
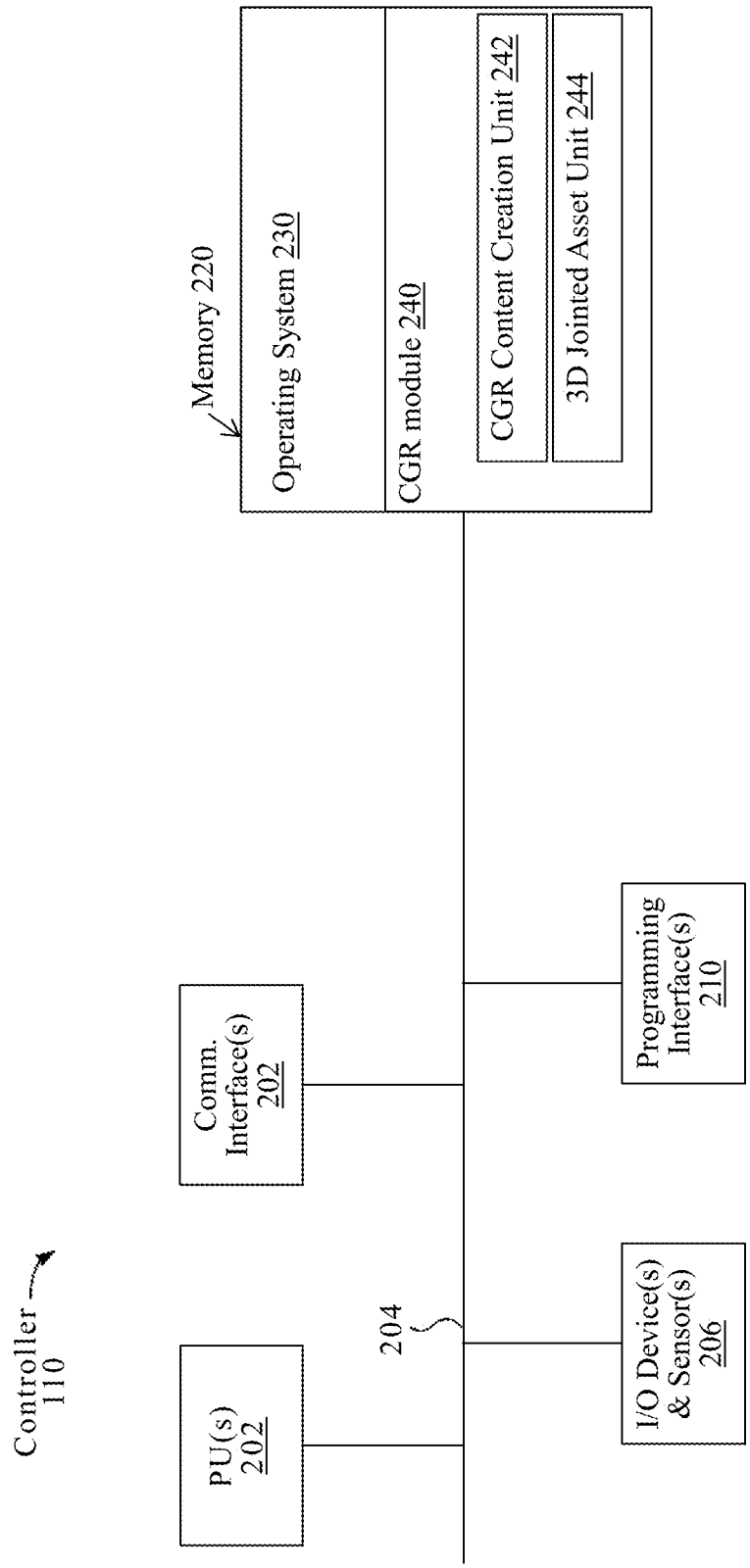
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices and sensors 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR module 240.

The operating system 230 includes procedures for handling various basic system services and for performing hardware dependent tasks. In some implementations, the CGR module 240 is configured to create, edit, or experience CGR environments. The 3D content creation unit 242 is configured to create and edit 3D content that will be used as part of CGR environments for one or more users (e.g., a single CGR environment for one or more users, or multiple CGR environments for respective groups of one or more users). A content-creation CGR environment may be provided by the CGR module 240 to facilitate the creation of such content. For example, the user may view and otherwise experience a CGR-based user interface that allows the user to select, place, move, and otherwise configure virtual objects in 3D content that is being created or edited, for example, based on providing input via hand gestures, voice commands, input device inputs, etc. A 3D jointed asset unit 244 is configured to facilitate the creation of jointed 3D animated assets during such a 3D content creation or editing experience using one or more deformable universal joint techniques disclosed herein for the jointed 3D animated assets. In some implementations, the deformable characteristics of deformable universal joint can be determined though machine learning using input motion data. Although these modules and units are shown as residing on a single device (e.g., the controller 110), it should be understood that in other implementations, any combination of these modules and units may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
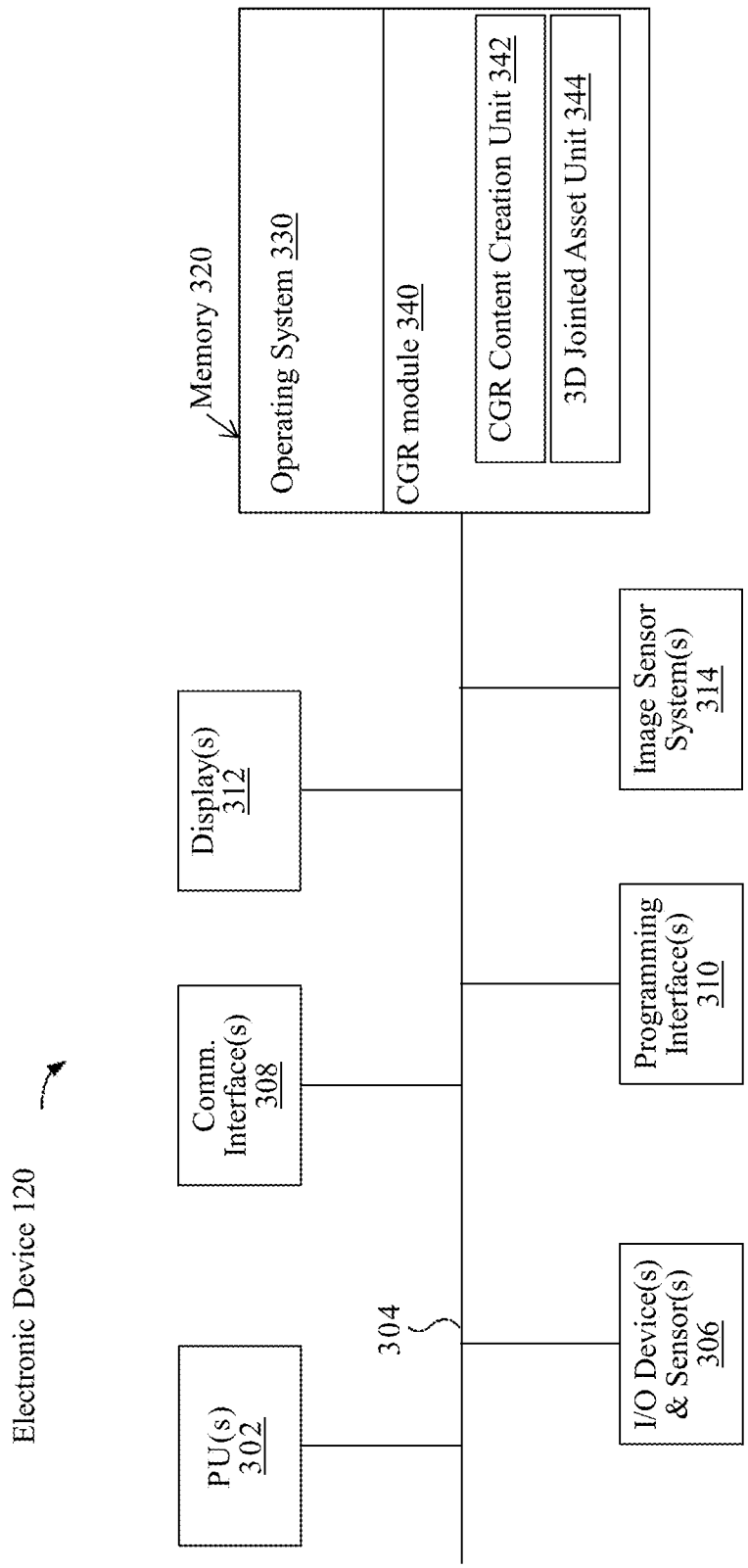
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks. In some implementations, the CGR module 340 is configured to create, edit, or experience CGR environments. The 3D content creation unit 342 is configured to create and edit 3D content that will be used as part of CGR environments for one or more users (e.g., a single CGR environment for one or more users, or multiple CGR environments for respective groups of one or more users). A content-creation CGR environment may be provided by the CGR module 340 to facilitate the creation of such content. For example, the user may view and otherwise experience a CGR-based user interface that allows the user to select, place, move, and otherwise configure virtual objects in 3D content that is being created or edited, for example, based on providing input via hand gestures, voice commands, input device inputs, etc. A 3D jointed asset unit 344 is configured to facilitate the creation of jointed 3D animated assets during such a 3D content creation or editing experience using one or more deformable universal joint techniques disclosed herein for the jointed 3D animated assets. In some implementations, the deformable characteristics of deformable universal joint can be determined though machine learning using input motion data. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
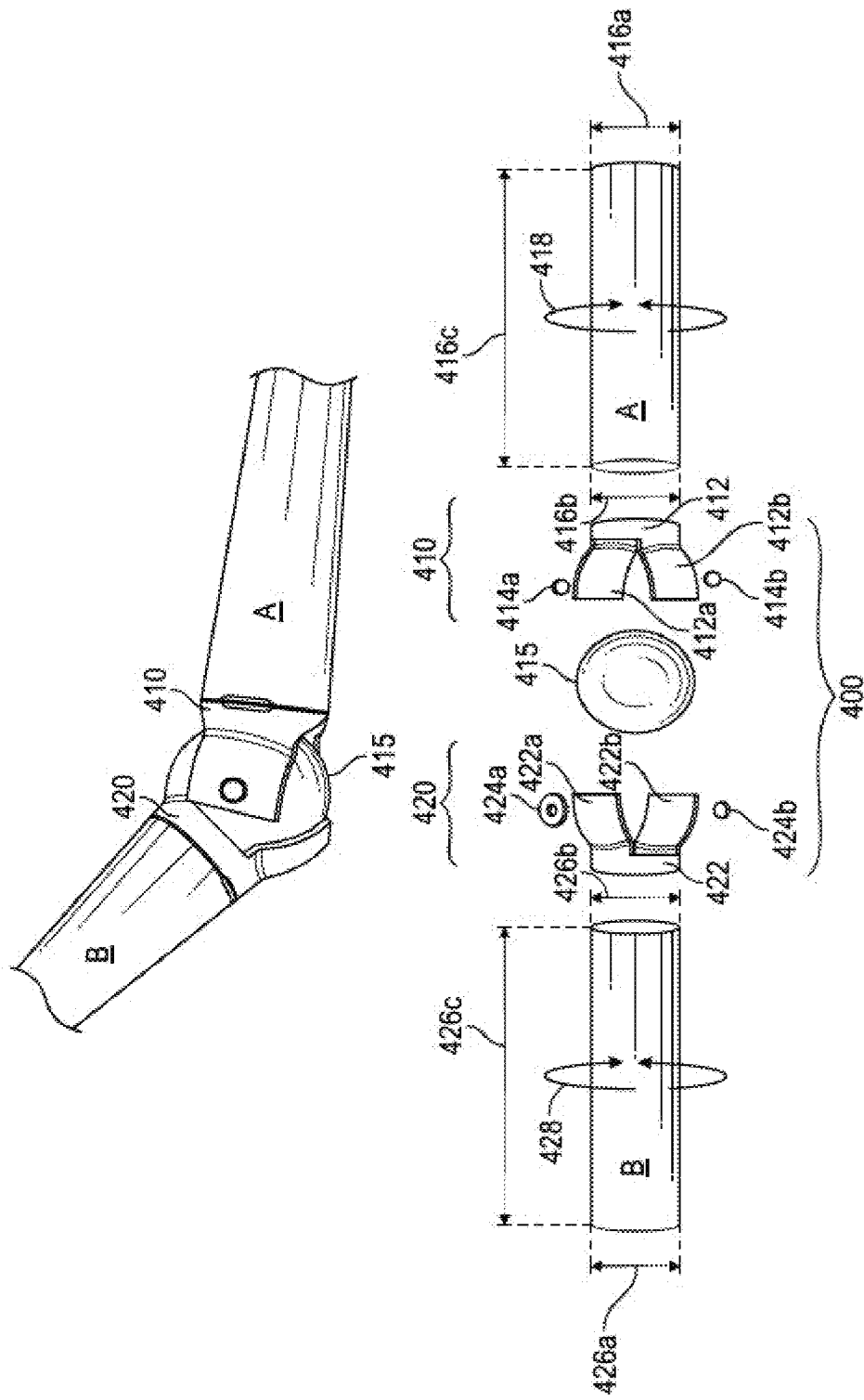
FIGS. 4-5B are diagrams of an example of a digital model of a joint for an animated 3D asset in accordance with some implementations.
Figure 5A:
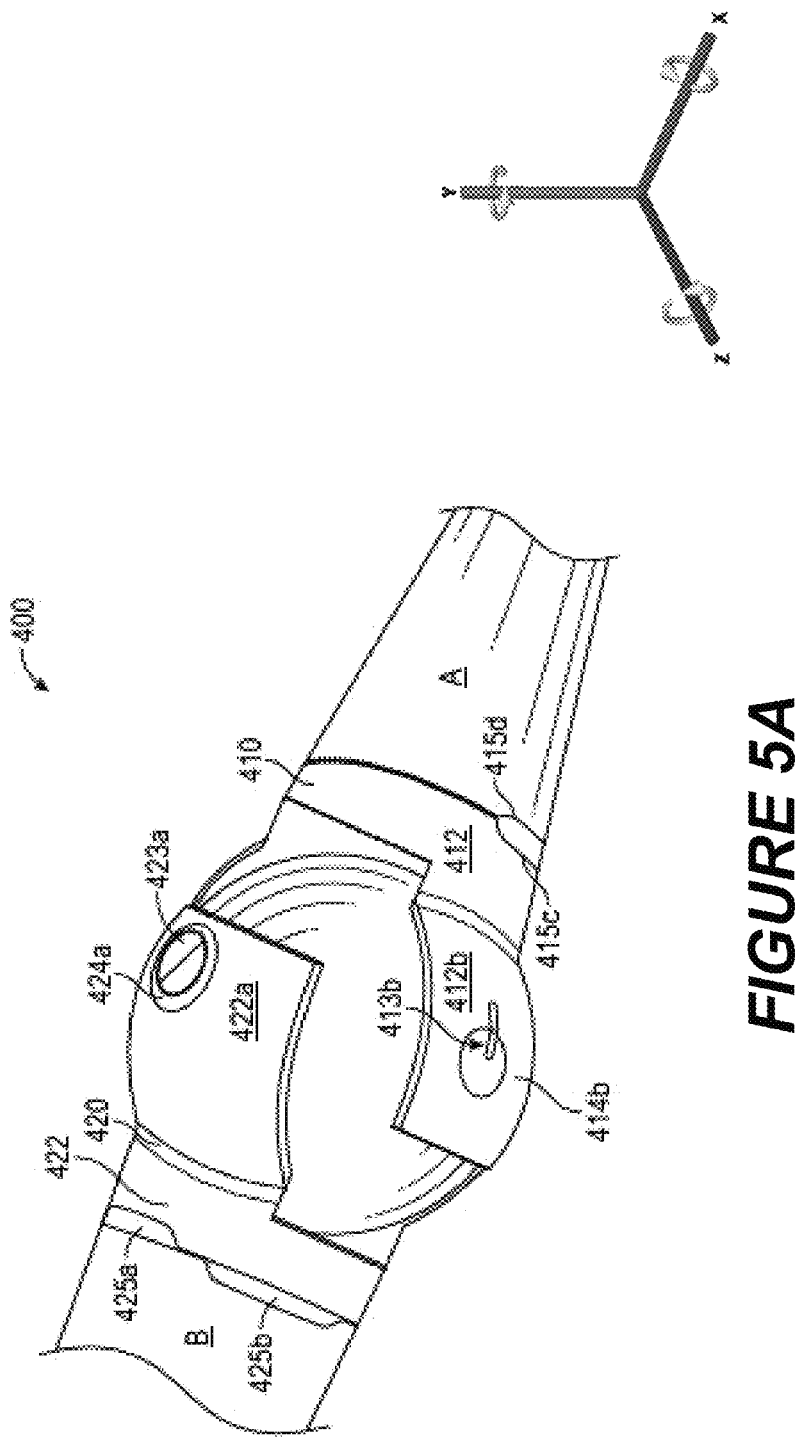
Figure 5B:
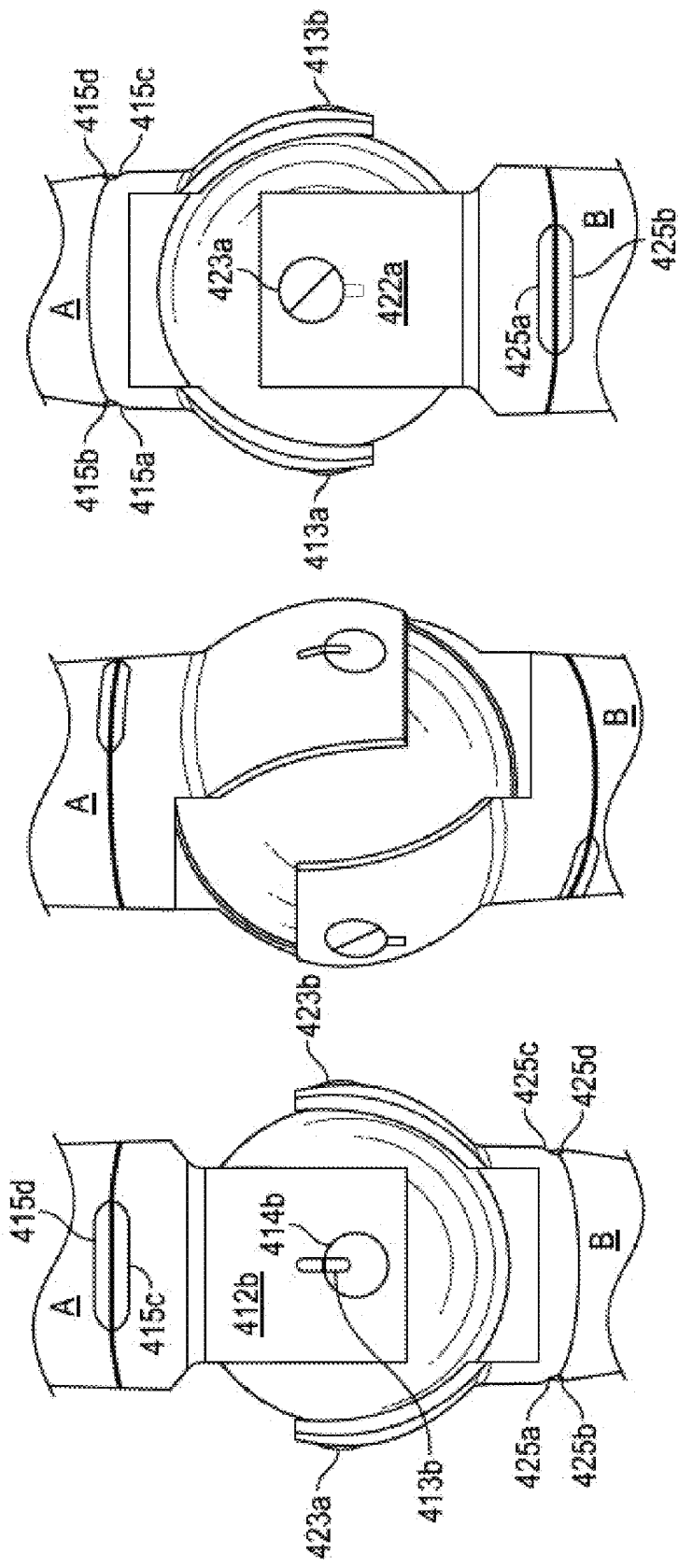

FIGS. 4-5B are diagrams that show an exemplary digital model of a joint that connects a first object to a second object for implementing aspects of the present disclosure. In various implementations, a joint 400 includes a first end 410 that connects through a deformable portion to a second end 420. In various implementations, the joint 400 includes the first end 410 that connects to a deformable coupler 415 and the second end 420 that connects to the deformable coupler 415 as shown in FIG. 4. In some implementations, the deformable coupler 415 is compressible or expandable. As shown in FIG. 4, in some implementations, the deformable coupler 415 is a compressible or expandable (e.g., squishy) ball. In some implementations, the material properties such as elasticity (e.g., squishiness) of the deformable coupler 415 are set by a user. In various implementations, the deformable coupler 415 is coupled to the first end 410 or the second end 420 so that the first end 410 can translate in three orthogonal planes while respectively rotating about each orthogonal axis of the three orthogonal planes.

As shown in FIG. 5A, the deformable coupler 415 is coupled to the first end 410 so that the first end 410 can translate in an x-z plane, an x-y plane and a y-x plane while maintaining the ability to rotate around the x-axis, y-axis and z-axis. As shown in FIG. 5A, the deformable coupler 415 is coupled to the second end 420 so that the second end 420 can translate in an x-z plane, an x-y plane and a y-x plane while maintaining the ability to rotate around the x-axis, y-axis and z-axis. The joint 400 is configured to connect the first end 410 with 6 DOF of movement to the second end 420 with the deformable coupler 415 therebetween. As also shown in FIG. 4, a first object A is coupled to the first end 410 so that the first object A can rotate 418 about a longitudinal axis of the first object A relative to the first end 410. A second object B is coupled to the second end 420 so that the second object B can rotate 428 about a longitudinal axis of the second object B relative to the second end 420.

In some implementations, the first object A and the second object B have shapes (e.g., cylinders, rectangles, bones, 3D object, etc.) that are variable and can be changed. In some implementations, the first object A and the second object B have sizes that are variable and can be changed. In some implementations, the first object A and the second object B have shapes or sizes that can be changed by a user. In some implementations, the first object A and the second object B are different in shape or size.

As shown in FIG. 4, a first connecting end of the object A is coupled to the first end 410, and the first connecting end has dimensions 416b (e.g., radius, diameter, length and width, etc.) that can be increased or decreased. In some implementations, dimensions of the first connecting end of the first object A correspond to dimensions of the first end 410. A second opposing connecting end of the first object A has dimensions 416a (e.g., radius, diameter, length and width, etc.) that can be increased or decreased. In some implementations, the dimensions 416a are different from the dimensions 416b. As shown in FIG. 4, a size of the first object A has dimensions 416c (e.g., radius, length and width, etc.) that can be increased or decreased.

As shown in FIG. 4, a first connecting end of the second object B is coupled to the second end 420, and the first connecting end of the second object B has dimensions 426b (e.g., radius, diameter, length and width, etc.) that can be increased or decreased. In some implementations, dimensions of the first connecting end of the second object B correspond to dimensions of the second end 420. A second opposing connecting end of the second object B has dimensions 426a (e.g., radius, diameter, length and width, etc.) that can be increased or decreased. In some implementations, the dimensions 426a are different from the dimensions 426b. As shown in FIG. 4, a size of the second object B has dimensions 416c (e.g., radius, length and width, etc.) that can be increased or decreased. In some implementations, a shape or size of an object changes (e.g., linearly, non-linearly, curved, stepped) along the length (e.g., 416c, 426c) of the object.

As shown in FIG. 4, in some implementations, the first object A and the second object B are bone-like structures or cylinders. As shown in FIG. 4, in some implementations, the first object A and the second object B are rigid.

In some implementations, the first object A and the second object B have material properties such as elasticity that are set by the user. In some implementations, the first object A and the second object B have variable elasticity. In some implementations, the variable elasticity of the first object A and the second object B varies spatially.

In various implementations, the first end 410 includes a base 412 and extensions projecting from the base 412 that are respectively coupled to the deformable coupler 415 at respective connection points. As shown in FIG. 4, the base 412 includes a slightly curved (e.g., concave) extension 412a that is rotatably connected to the deformable coupler 415 by a disc 414a and an opposing slightly curved (e.g., concave) extension 412b that is rotatably connected to the deformable coupler 415 by a disc 414b. In some implementations, a shape (e.g., polygonal, curved) or size (e.g., width, length, spacing, depth, etc.) of the extension 412a, the extension 412b, the extension 422a, or the extension 422b is variable as desired between the base 412, the base 422 and the respective corresponding connection points. In some implementations, the disc 414a and the disc 414b provide opposing connection points. In some implementations, the disc 414a and the opposing disc 414b provide connection points that are 180° apart. In various implementations, the second end 420 includes a base 422 and extensions projecting from the base 422 that are respectively coupled to the deformable coupler 415 at respective connection points. As shown in FIG. 4, the base 422 includes a slightly curved (e.g., concave) extension 422a that is rotatably connected to the deformable coupler 415 by a disc 424a and an opposing slightly curved (e.g., concave) extension 422b that is rotatably connected to the deformable coupler 415 by a disc 424b. In some implementations, the disc 424a and the disc 424b provide opposing connection points. In some implementations, the disc 424a and the opposing disc 424b provide connection points that are 180° apart. In some implementations, a shape (e.g., polygonal) or size of the disc 414a, the disc 414b, the disc 424a, or the disc 424b are varied as desired.

In some implementations, the discs 414a, 414b rotate with the deformable coupler 415 while the extensions 412a, 412b do not move. Thus, the deformable coupler 415 is rotatably secured in the first end 410. Similarly, in some implementations, the discs 424a, 424b rotate with the deformable coupler 415 while the extensions 422a, 422b do not move. Thus, the deformable coupler 415 is rotatably secured in the second end 420.

In various implementations, the extensions 412a, 422a, 412b, 422b, are configured to reduce or prevent interference with one another during movement of the first object A (e.g., the first end 410) with respect to the second object B (e.g., the second end 420). As shown in FIG. 4, in some implementations there are gaps respectively between the extensions 412a, 422a, 412b, 422b so that the extensions 412a, 422a, 412b, 422b do not interfere or restrict one another during movement of the first object A (e.g., the first end 410) with respect to the second object B (e.g., the second end 420). Further, a surface of the base 412 facing the deformable coupler 415 is configured to reduce or prevent interference with the extensions 422a, 422b and a surface of the base 422 facing the deformable coupler 415 is configured to reduce or prevent interference with the extensions 412a, 412b during movement of the first object A (e.g., the first end 410) with respect to the second object B (e.g., the second end 420). As shown in FIG. 4, in some implementations surface of the base 412 facing the deformable coupler 415 includes a recessed portion (e.g., concave channel) to reduce or prevent interference with the extensions 422a, 422b, and the surface of the base 422 facing the deformable coupler 415 includes a recessed portion (e.g., concave channel) to reduce or prevent interference with the extensions 412a, 412b. In some implementations, a shape (e.g., polygonal, curved) or size (e.g., width, length, spacing, depth, etc.) of such recessed portions is variable as desired.

In some implementations, corresponding ends of the first object A and the second object B have the same size and shape (e.g., the base 412 of the first end 410 has the same size as the base 422 of the second end 420). As shown in FIG. 4, in some implementations, projecting extensions of the first end 410 and the corresponding projecting extensions of the second end 420 have the same size and shape (e.g., the extensions 412a, 412b of the first end 410 have the same size as the extensions 422a, 422b of the second end 420). In some implementations, projecting extensions of the first end 410 and the corresponding projecting extensions of the second end 420 have a different size or shape (e.g., the extensions 412a, 412b of the first end 410 have a different size or shape as the extensions 422a, 422b of the second end 420).

Implementations of the first end 410, the deformable coupler 415 and the second end 420 illustrated in FIGS. 4-5B is not limited to the constructional detail shown there or described herein. As those of skill in the art will understand that a number of variations may be made in the disclosed implementations, all without departing from the rotational and translational connections of the first end 410 to the deformable coupler 415, rotational and translational connections of the second end 420 to the deformable coupler 415, the rotational connection of the first end 410 to the first object A, and the rotational connection of the second end 420 to the second object B.

In various implementations, the deformable coupler 415 deforms (e.g., compresses or expands) during movement of the first end 410 (e.g., the first object A) with respect to the second end 420 (e.g., the second object B) while allowing the rotational and translational connections of the joint 400 described herein. Thus, in various implementations, deformable coupler 415 deforms and changes size or shape to bring the connected objects (e.g., the first end 410 to the second end 420, objects A and B) closer to or farther from one another with respect to one, two, or all 3 orthogonal directions while allowing the rotational and translational connections of the joint 400 described herein.

In various implementations, the first end 410 includes a base 412 and opposing extensions 412a, 412b that are respectively coupled to the deformable coupler 415 at opposing connection points (e.g., discs 414a, 414b). In various implementations, the second end 420 includes opposing extensions 422a, 422b that are respectively coupled to the deformable coupler 415 at opposing connection points (e.g., discs 424a, 424b). In some implementations, the opposing discs 414a, 414b and the opposing discs 424a, 424b provide connection points that move when the deformable coupler 415 deforms. In some implementations, the connection points that couple the opposing extensions 412a, 412b and the opposing extensions 422a, 422b move in a single direction. In some implementations, the opposing discs 414a, 414b and the opposing discs 424a, 424b are mounted to move along a rail while maintaining the ability to rotate relative to the corresponding extensions 412a, 412b, 422a, 422b. In some implementations, the connection points that couple the opposing extensions 412a, 412b and the opposing extensions 422a, 422b move at least two directions in accordance with force generated upon movement of the character (e.g., objects A and B). In some implementations, the opposing discs 414a, 414b and the opposing discs 424a, 424b are mounted to move within a 2D recess while maintaining the ability to rotate relative to the corresponding extensions 412a, 412b, 422a, 422b.

As shown in FIGS. 5A-5B, in some implementations, markers are included on the first end 410 and the second end 420 of the joint 400 to detect rotational movements during movement of the digital model of a character. As shown in FIGS. 5A-5B, in some implementations, markers 413a (not visible), 413b, 423a, 423b (not visible), 415a (not visible), 425a, 415c, 425c (not visible) are included on the first end 410 and the second end 420. In some implementations, the markers 413a, 413b, 423a, 423b, 415a, 425a, 415c, 425c are detected on the joint 400 during movement of the digital model of the character to more easily determine rotational movements (e.g., translational movements) of the first end 410 and the second end 420. In some implementations, the markers 413a, 413b, 423a, 423b, 415a, 425a, 415c, 425c are unique (e.g., different shapes or colors) on the joint 400. In some implementations, the markers 413a, 413b, 423a, 423b are respectively located on the extensions 412a, 412b, 422a, 422b of the joint 400. As shown in FIG. 5A, in some implementations, markers 413a, 413b, 423a, 423b are respectively located on the discs 414a, 414b, 424a, 424b of the first end 410 and the second end 420. In various implementations, the markers 413a, 413b, 423a, 423b are positioned anywhere on the joint 400 that allows detection of the markers 413a, 413b, 423a, 423b to indicate rotational movements of the joint 400. In some implementations, markers (e.g., the markers 413a, 413b, 423a, 423b) are implemented by two or more detectable portions that provide perceptible indications on the joint 400 during movement of the digital model of the character. For example, in some implementations, the marker 413b is implemented by a first detectable portion on the disc 414b and a second detectable portion on the extension 412b. In some implementations, the markers 413a, 413b, 423a, 423b are visually detected on the joint 400 during movement of the digital model of the character.

As shown in FIGS. 5A-5B, in some implementations, markers 415a, 415c, 425a, 425c are respectively included on the first end 410 and the second end 420 and corresponding markers 415b, 415d, 425b, 425d are included on the first object A and the second object B. In some implementations, the markers 415a, 415b, 415c, 415d, 425a, 425b, 425c, 425d, are respectively detected on the joint 400, the first object A and the second object B during movement of the digital model of the character to more easily determine rotational movements (e.g., translational movements) of the first object A relative to the first end 410 and rotational movements (e.g., translational movements) of the second object B relative to the second end 420. In some implementations, the markers 413a, 413b, 423a, 423b, 415a, 415b, 415c, 415d, 425a, 425b, 425c, 425d are unique (e.g., different shapes or colors). In some implementations, the markers 415a, 415b, the markers 415c, 415d, the markers 425a, 425b, and the markers 425c, 425d are respectively located adjacent to one another at a rest position of the digital model of the character. As shown in FIG. 5A, the markers 415c, 415d are at the rest position of the digital model of the character adjacent each other, but the markers 425a, 425b have been moved away from the rest position. In various implementations, the markers 415a, 415b, 415c, 415d, are positioned anywhere on the first object A and the first end 410, respectively, that allows detection of the markers 415a, 415b, 415c, 415d to indicate rotational movements of the first object A relative to the first end 410. In various implementations, the markers 425a, 425b, 425c, 425d are positioned anywhere on the second object B and the second end 420, respectively, that allows detection of the markers 425a, 425b, 425c, 425d to indicate rotational movements of the second object B relative to the second end 420. In some implementations, the markers 415a, 415c, 425a, 425c are visually detected on the joint 400 during movement of the digital model of the character.

As shown in FIGS. 5A-5B, in some implementations, a rotation X axis, a rotation Y axis, and a rotation Z axis of the joint 400 is respectively assigned to 3 markers or 3 paired markers, as desired. For example, in some implementations, the rotation X axis, the rotation Y axis, and the rotation Z axis of the joint 400 is respectively assigned to markers, 415a, 415b; 413b; and 425c, 425d, as desired. In another example, in some implementations, the rotation X axis, the rotation Y axis, and the rotation Z axis of the joint 400 is respectively assigned to markers, 415c, 415d; 423a; and 425a, 425b, as desired.

As shown in FIG. 5B, in some implementations, when paired markers are perfectly aligned, the underlying corresponding joint components have a rotational axis value of 0° or 180° relative to each other. When paired markers are out of alignment, the unaligned paired markers provide a visual indicator that the joint components have been moved or rotated relative to each other from the original rest positions of the paired markers.

FIG. 6 is a diagram that shows expansion and contraction of an example deformable coupler of a joint according to some implementations. As shown in FIG. 6, the deformable coupler 415 expands 610 when force is applied to move the object A away from the object B. Similarly, implementations of the deformable coupler 415 contracts 620 when force is applied to move the object A toward the object B. As shown in FIG. 5A, exemplary implementations of the deformable coupler 415 provide additional limited translational movement within or relative to an initial or rest position of the first end 410 (e.g., the first object A) and the second end 420 (e.g., the second object B). In various implementations, the deformable coupler 415 deforms and changes size or shape to bring the connected objects (e.g., the first end 410 to the second end 420) closer to or farther from one another with respect to one, two, or all 3 orthogonal directions while allowing the rotational and translational connections of the joint 400 described herein.

As shown in FIG. 6, in some implementations, connection points between the deformable coupler 415 and the first end 410 and connection points between the deformable coupler 415 and the second end 420 are fixed during expansion and contraction of the deformable coupled 415. Further, material properties of the compressible deformable coupler 415 are adjustable to represent different material properties to increase or decrease the amount of desired compressibility (e.g., between the first end 410 and the second end 420).

In some implementations, the deformable coupler 415 is compressible or expandable without a change in volume (e.g., size) upon movement from rest by the first object A or the second object B. Thus, in some implementations, the expansion is performed without gain (e.g., an increase in size) and compression is performed without loss (e.g., an decrease in size) by the deformable coupler 415.

Alternatively, in some implementations, the deformable coupler 415 includes a volume (e.g., size) change upon compression or expansion upon movement from rest by the first object A or the second object B. In some implementations, the volume change (e.g., increase or decrease) is an instantaneous volume loss or gain by the deformable coupler 415. In some implementations, the volume change is a constant rate volume loss or gain, or a volume loss or gain proportional to the force applied to the deformable coupler 415 upon movement from rest by the first object A or the second object B. In some implementations, the volume change is a variable rate volume loss or gain upon movement from rest by the first object A or the second object B. In some implementations, the volume change (e.g., loss or gain) of the deformable coupler 415 is between a first size (e.g., minimum) and a second size (e.g., maximum) or within a prescribed volume range.

In various implementations, the deformable coupler 415 can have material properties set by the user such as elasticity. In some implementations, the material properties of the deformable coupler 415 are constant throughout. In some implementations, the material properties of the deformable coupler 415 are variable by location or are dynamically temporal variable material properties. In some implementations, the material properties of the deformable coupler 415 are variable based on the force that is applied to the deformable coupler 415.

Figure 7:
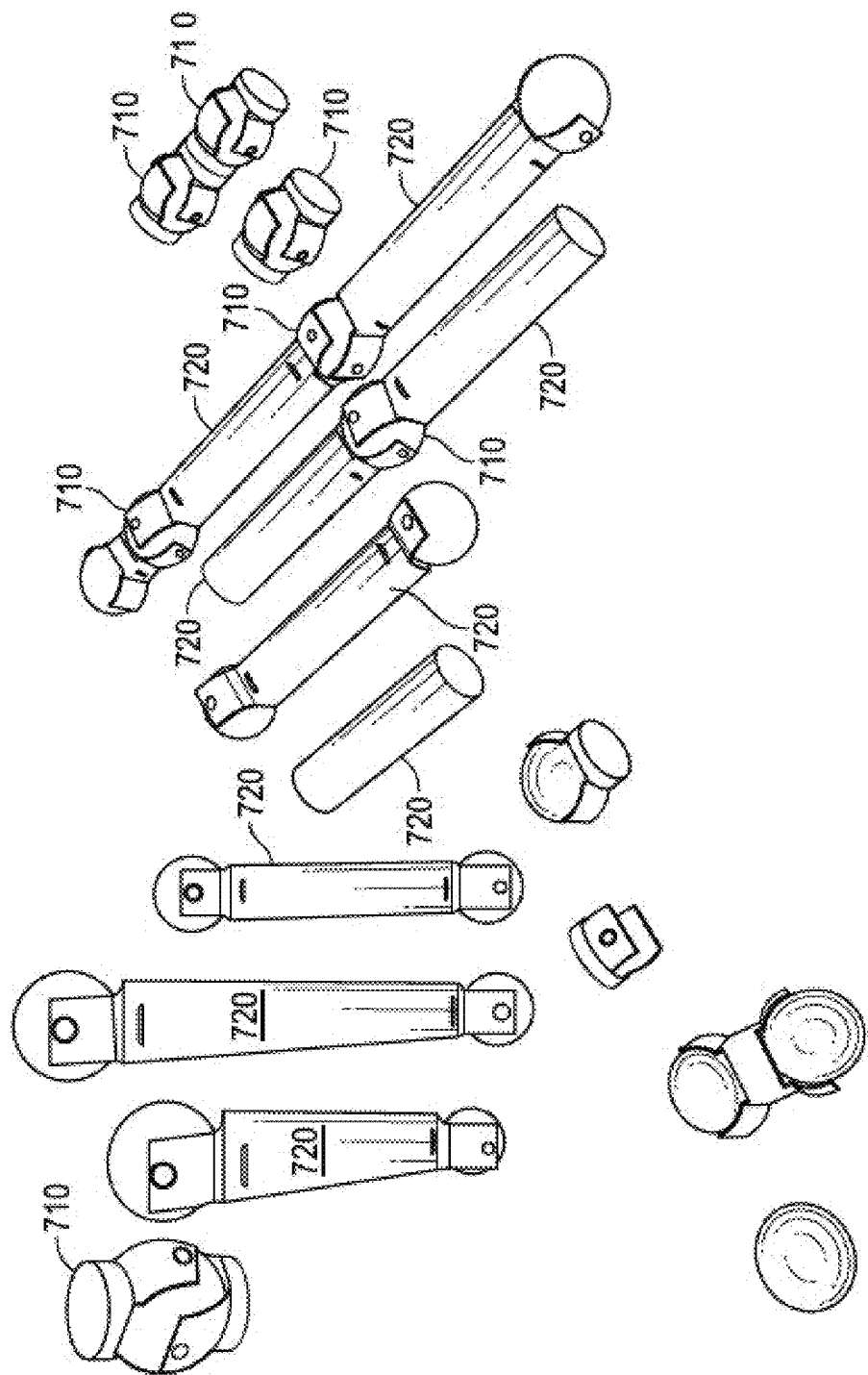
FIG. 7 is a diagram that shows example modular components of a joint according to some implementations.

FIG. 7 is a diagram that shows example modular components of a joint according to some implementations. As shown in FIG. 7, objects 710 and joints 720 are modular and can be connected in multiple ways. In some implementations, modular units can be added to a jointed 3D animated asset, where each additional modular unit comprises an additional joint 720 and an additional object 710. In some implementations, a jointed 3D animated asset can be represented by a plurality of M objects connected by a plurality of N joints, where M and N are positive integers and M>N.

As shown in FIG. 7, in various implementations, a size of the objects 710 or a size of the joints 720 can be changed. In some implementations, a length (e.g., 416c, 426c) of the objects 710 can be changed. In some implementations, dimensions (e.g., a radius, 416a, 416b, 426a, 426b) at either end of the objects 710 can be changed to create proportional variations using the joints 720 that represent a wide variety of flexible, coupled joint chains or jointed 3D animated assets (e.g., linkages) that function together.

As shown in FIGS. 4-7, the deformable coupler 415 is implemented by a deformable sphere or ball. Implementations of a deformable coupler for the joint 400 are not intended to be so limited. In various implementations, deformable couplers of the joint 400 can have various shapes or modeled representations that allow deformation (e.g., expansion or compression) to occur upon movement from the rest position of the first end 410 (e.g., the first object A) or the second end 420 (e.g., the second object B). Accordingly, in some implementations, the deformable coupler 415 is a non-spherical solid such as a solid ellipsoid, a tetrahedral structure, etc. In some implementations, the deformable coupler 415 is represented by a finite element including a plurality of directional springs. In some implementations, the deformable coupler 415 is represented by a wrap-deformer model including a plurality of anchor points. In some implementations, the deformable coupler 415 is represented by a sphere of pistons coming from a plurality of different respective directions. In some implementations, a deformable coupler for the joint 400 is modeled to mimic real-time behavior of a corresponding real-world action of a selected real-world joint. In some implementations, a deformable coupler for the joint 400 is modeled to mimic real-time behavior of a corresponding action of a selected fantasy or imaginary joint.

Figure 8A:
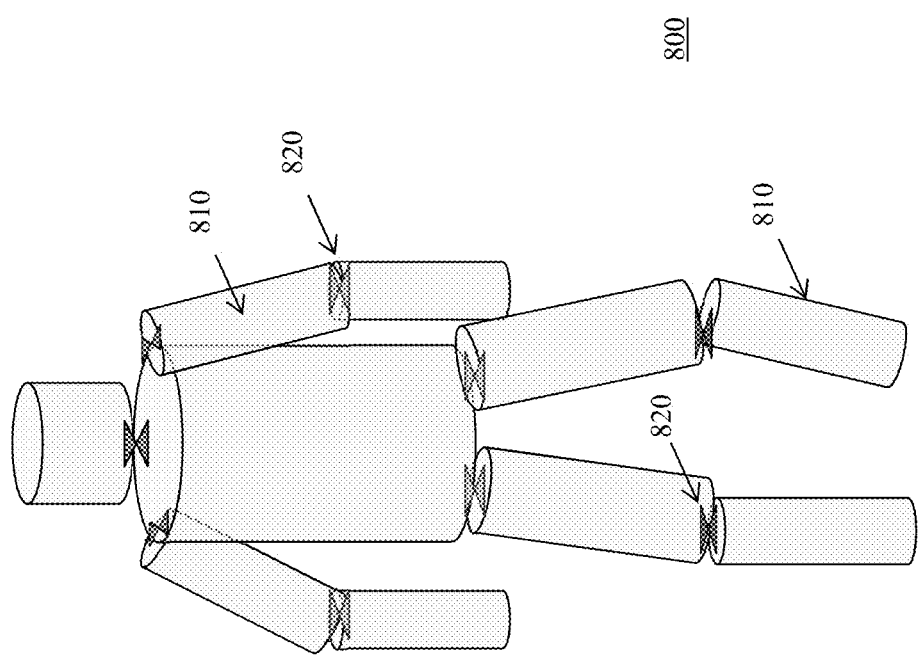
FIGS. 8A-8D are diagrams that shows example 3D animated assets including at least one joint according to some implementations.

FIG. 8A is a diagram that shows example 3D animated asset including at least one deformable universal joint according to some implementations. In some implementations, a jointed 3D animated asset 800 can be represented by a plurality of M objects 810 connected by a plurality of N joints 820, where M and N are positive integers and M>N. In some implementations, N=M−1. As shown in FIG. 8A, in some implementations, each joint 820 is modeled by the joint 400, but each joint 820 can use a different selected or prescribed subset of the rotational and translational connections of the joint 400 described herein. In some implementations, using less than all possible rotational and translational connections of the joint 400 allows alternate types of joints or alternate joint motions to be imitated. In some implementations, alternate types of joints or alternate joint motions to be imitated by the joint 400 include imitated real-world or imaginary character or objects for a CGR environment. For example, for a humanoid 3D animated asset as shown in FIG. 8A, in some implementations, hinge joints for limbs to flex and extend along only one axis (e.g., elbows, fingers, toes) can be imitated by joints 820. In some implementations, pivot joints that provide for rotation (side to side) around only one axis (e.g., neck, forearm rotation) can be imitated by joints 820. In some implementations, ball and socket joints allow for bending and circular movement as well as rotation of the limb (e.g., shoulder and hip joints) can be imitated by joints 820. In some implementations, ellipsoidal joints are ball and socket joints that are elliptical rather than round, allowing bending and circular movement but preventing rotation (e.g., in the wrist and the base of the index finger) can be imitated by joints 820. In some implementations, saddle joints have connecting bones shaped like interlocking saddles to provide a greater range of motion than hinge joints but not complete rotation like ball and socket joints (e.g., thumb) can be imitated by joints 820.

In some implementations, fantasy 3D asset joints (e.g., dragon wings) can be imitated by joints 820. In some implementations, joints for an 3D animated object (e.g., pirate ship and rigging) can be imitated by joints 820. In some implementations, joints (e.g., range of motion or compressibility or expansion of the deformable coupler) for an jointed 3D asset are determined for the joint by machine learning using input character movement data.

Figure 8B:
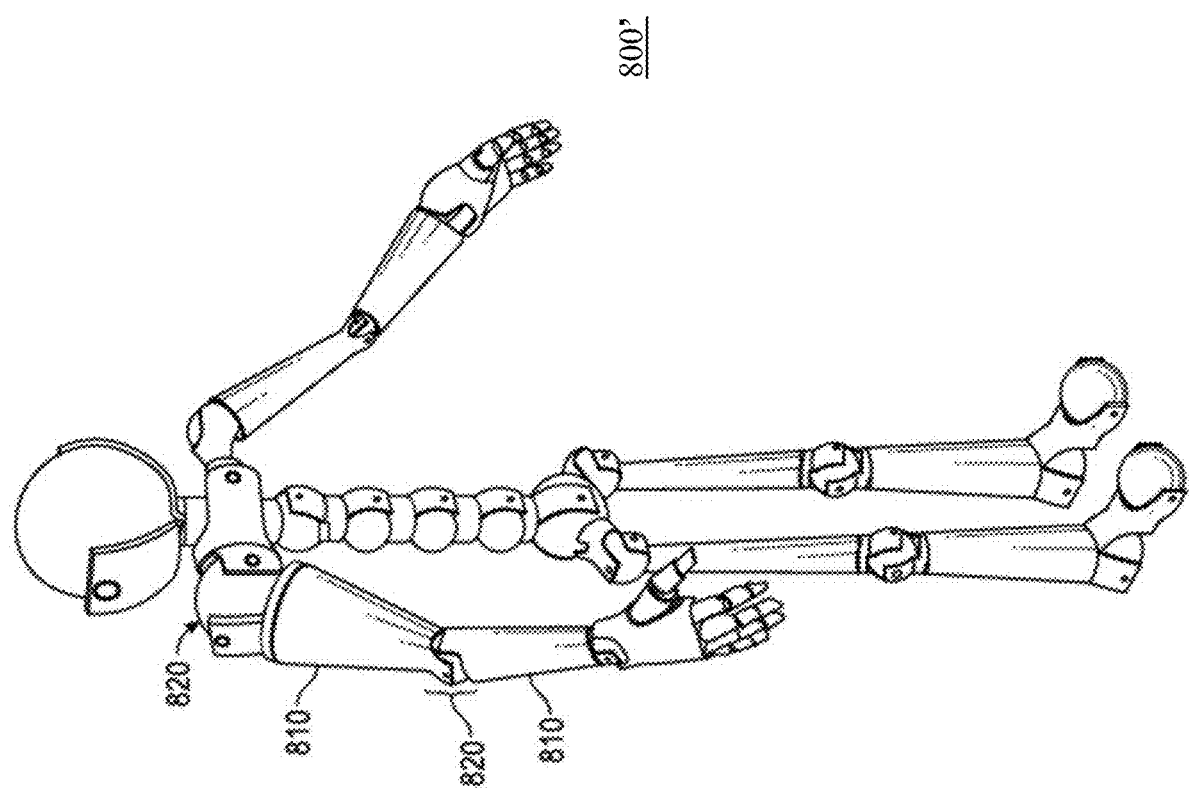
Figure 8C:
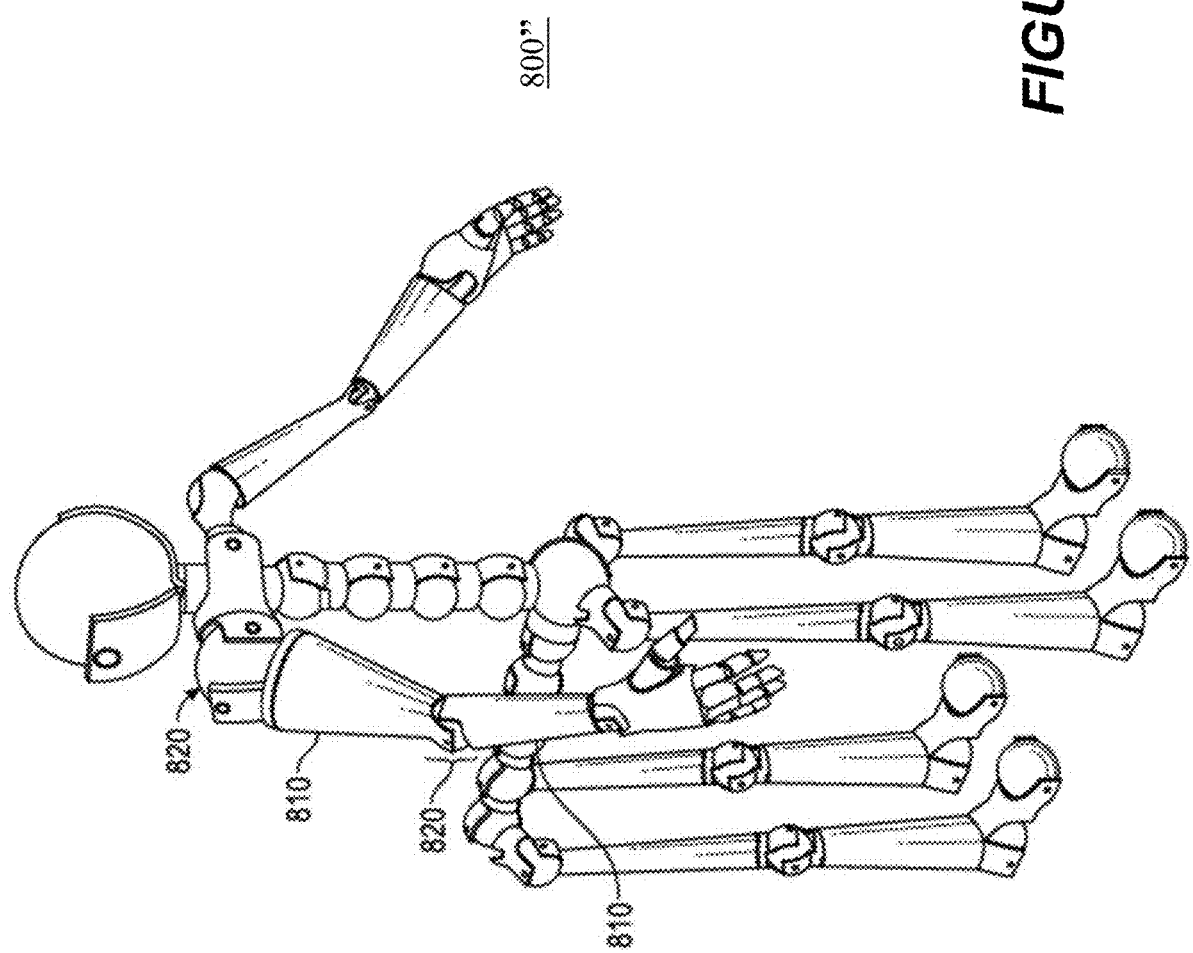
Figure 8D:
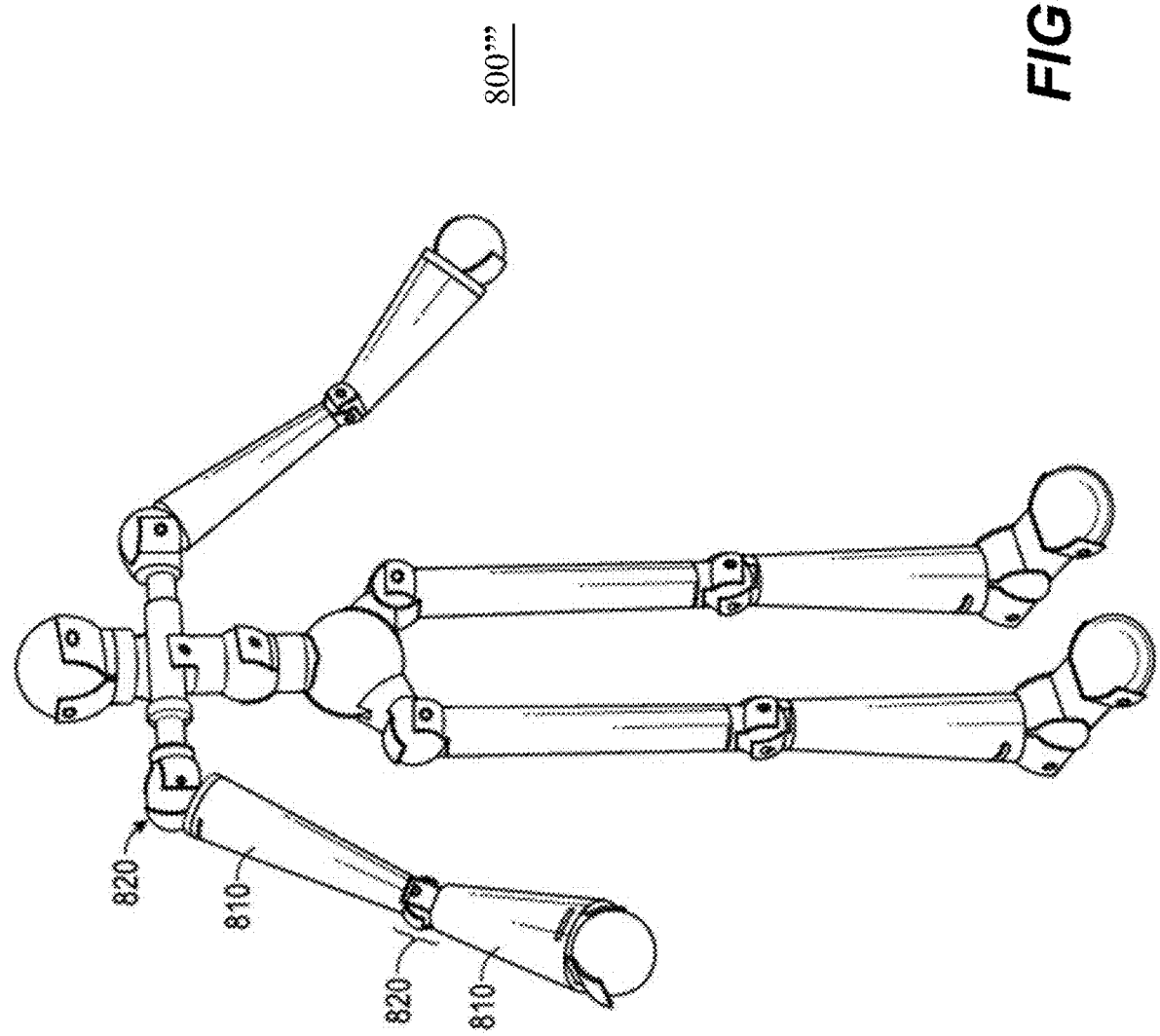

FIGS. 8B-8D are diagrams that shows example 3D animated assets including at least one deformable universal joint according to some implementations. In some implementations, jointed 3D animated assets 800', 800", 800''' can be represented by a plurality of M objects 810 connected by a plurality of N joints 820, where M and N are positive integers and M>N. As shown in FIGS. 8B-8D, in some implementations, each joint 820 is modeled by the joint 400, but each joint 820 can use a different selected or prescribed subset of the rotational and translational connections of the joint 400 described herein.

FIGS. 8B-8D show jointed 3D animated assets 800', 800", 800''' that include objects 810 having different longitudinal lengths. FIGS. 8B-8D show objects 810 having different shapes (e.g., forms). FIGS. 8B-8D show objects 810 having different sizes (e.g., widths or diameters) that are connected between respective joints 820 that are different sizes.

In some implementations, a jointed 3D animated asset includes a joint chain of a 3D character or 3D object, where the joint chain includes a plurality of connected objects and joints of the jointed 3D animated asset. In some implementations, the joint chain includes a plurality of connected objects and joints where movement of at least one object in the joint chain is transferred to remaining objects in the joint chain by characteristics of the deformable joints (e.g., 820) in the joint chain. In some implementations, the objects in the joint chain are rigid. In some implementations, the joint chain represents a portion of the skeleton of the jointed 3D animated asset. In some implementations, the joint chain represents all of the skeleton of the jointed 3D animated asset. As shown in FIGS. 8A-8D, jointed 3D animated assets can be considered a single joint chain or a plurality of smaller joint chains that combine to form the jointed 3D animated assets 800, 800', 800". 800'''.

In some implementations, characteristics of the deformable joints (e.g., 820) in a joint chain are the same. In some implementations, although the deformable joints (e.g., 820) in a joint chain represent different types of joints, an elasticity or compressibility of deformable couplers (e.g., 415) in the different types of joints can be the same in the joint chain. In some implementations, an elasticity or compressibility of deformable couplers (e.g., 415) in at least two of the deformable joints (e.g., 820) in a joint chain have different respective elasticity or compressibility. In some implementations, an elasticity or compressibility of deformable couplers (e.g., 415) in the deformable joints (e.g., 820) in a joint chain varies by the different types of joints. In some implementations, an elasticity or compressibility of deformable couplers (e.g., 415) in the deformable joints (e.g., 820) for each joint of the same type of joint in a joint chain varies.

In some implementations, a positional location of at least one object in a joint chain can be prioritized. Thus, in a joint chain representing a humanoid 3D animated asset, a foot position can be prioritized higher that a hand position when resolving relative locations of other or all objects in the joint chain. In some implementations, an elasticity of at least one deformable joint in a joint chain can be prioritized. Thus, in a joint chain representing a humanoid 3D animated asset, a neck joint elasticity can be prioritized higher that a shoulder or elbow elasticity when resolving relative locations of other or all objects in the joint chain when implanting movement of the character. In some implementations, elasticity (e.g., compressibility or expansion) of joints, e.g., within a range of motion, for a jointed 3D asset are determined for the joint by machine learning using input character movement data.

FIG. 9 is a flowchart illustrating an exemplary method of machine learning at least one material property of a deformable joint (e.g., stiffness/squishiness/elasticity of the ball or deformable coupler 415) using input character motion data. In some implementations, the method 900 is performed by a device (e.g., controller 110 or electronic device 120 of FIGS. 1-3). The method 900 can be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

After starting in block 905, at block 910, the method 900 obtains input motion capture data for a jointed 3D character displayed in a user interface. In one example, the motion capture data will be for a specific action of the character such as walking. In another example, the motion capture data will be for a series of events for the character such as actions taken throughout an activity or a time period. In some implementations, motion capture data includes any data that will move a jointed 3D skeleton for a digital character. In some implementations, motion capture data is defined by hand keyed animation. In some implementations, the user is a content creator or a person using the electronic device in a CGR environment.

In some examples, the input motion capture data includes rotations and positions for all bones in a skeleton of a jointed 3D character in the time period of the motion capture. In some examples, the input motion capture data will include rotations and some positions for all bones in the skeleton of the jointed 3D character in the time period of the motion capture. In some examples, the input motion capture data will include some rotations and some positions for some bones in the skeleton of a jointed 3D character in the time period of the motion capture.

At block 920, the method 900 identifies a skeleton chain including all joints and bones of the jointed 3D character. In one example, types of joints for each joint in the skeleton chain are known. In another example, there is no information regarding the joints, and a range of motion for each joint in the skeleton chain is also to be determined from the input motion capture data. In block 930, in some implementations, initially, a stiffness of each deformable joint is set to zero or rigid. Alternatively, at block 930, in some implementations, at least two deformable joints (e.g., deformable couplers) in the skeleton have non-zero different respective stiffness (e.g., material characteristics).

At block 930, the method 900 applies the input motion capture data to move an initial position of the skeleton of the jointed 3D character to a final positon resulting from the input motion capture data.

At block 940, the method 900 determines whether resultant character motions are acceptable as the jointed 3D character moved between the initial position to the final positon according to the input motion capture data in block 930. In some implementations, the resultant character motions are acceptable when a number of improper actions that occur for the jointed 3D character at block 930 is below a prescribed threshold. In some implementations, the resultant character motions are acceptable when no improper actions occur for the jointed 3D character at block 930. At block 940, other standards can be used to determine whether resultant character motions are acceptable. An example improper action can be an improper movement that violates preset skeletal movements or an improper movement that causes inconsistent positional movements so that the character "jumps" or "pops" without sufficient time between sequential positions. Another example improper movement can be an improper joint movement such as trying to move a humanoid "knee" or "finger" beyond 180 degrees or in a motion beyond a linear "hinge motion".

At block 950, the method 900 reduces a stiffness of a deformable coupler for each deformable joint adjacent a bone in the skeleton that incurred an improper action while the jointed 3D character traveled from the initial position to the final positon according to the input motion capture data of block 930. The respective change in stiffness can be a percentage, a predefined step or amount, or related to the amount of improper action, or number of improper actions, etc. In various implementations, the reduction in stiffness for deformable joints at block 950 is automatically, semi-automatically, or manually performed.

When the determination in block 940 is negative, the method 900 continues control to block 950. Thus, in some implementations, blocks 930-950 can be repeated until the improper actions are below a preset threshold or determined to be otherwise acceptable in block 940. Alternatively, in some implementations, blocks 930-950 can be repeated a set number of times.

As shown in FIG. 9, optional block 960 can be provided between block 950 and block 930. At block 960, the method 900 allows the operator to modify priorities with respect to movements of the skeleton of the jointed 3D character. In some implementations, a positional priority for objects in the skeleton of the jointed 3D character can be changed (e.g., set higher or lower). For example, at block 960 at least one of the objects (e.g., foot) in the skeleton (e.g., joint chain) can receive a higher positional priority. In some implementations, a priority for deformable joints in the skeleton of the jointed 3D character can be changed (e.g., set higher or lower). In some implementations, the priorities in block 960 can be based on the improper actions (e.g., number or type) that occur at block 930.

When the determination in block 940 is positive, the method 900 continues control to block 970, where it is determined whether there is additional input motion character data to be applied to the machine learning of the character action. When the determination in block 970 is negative, the method 900 ends. When the determination in block 970 is positive, the method 900 continues control to block 980, where the method 900 obtains the additional motion input data for the jointed 3D character. From block 980, the method 900 returns control to block 930.

Numerous specific details are set forth herein to provide a thorough understanding of the claimed subject matter. However, those skilled in the art will understand that the claimed subject matter may be practiced without these specific details. In other instances, methods apparatuses, or systems that would be by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel. In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein are implemented on an electronic device including a processor.

In some implementations, a digital model of a character is created including a joint that connects a first object to a second object. In some implementations, a first end of the first object connects to a surface of a deformable coupler such that the first object is capable of rotating relative to the deformable coupler, and a second end of the second object connects to the surface of the deformable coupler such that the second object is capable of rotating relative to the deformable coupler. When a motion is applied to the digital model of the character, the deformable coupler deforms to allow translation of the first object with respect to the second object while allowing the first object and second object to rotate.

In some implementations, the first object and the second object are bone-like structures or cylinders. In some implementations, the first object and the second object are not rigid. In some implementations, shapes of the first object and the second object are selectable, and wherein dimensions of the selected shapes of the first object and the second object are variable.

In some implementations, the deformable coupler is compressible or expandable. In some implementations, the deformable coupler is a ball with prescribed material characteristics.

In some implementations, the first end has a forked end around part of the deformable coupler to connect the first object to the deformable coupler while allowing the first object to rotate relative to a center of the deformable coupler, wherein the first end further rotates relative to the first object. In some implementations, the second end has a forked end around part of the deformable coupler to connect the second object to the deformable coupler while allowing the second object to rotate relative to the center of the deformable coupler, wherein the second end further rotates relative to the second object. In some implementations, the forked end of the first end is configured to avoid or reduce interference with the forked end of the second end during motion of the first object or motion of the second object.

In some implementations, the deformable coupler changes size or shape to bring the first object closer to or farther from the second object while allowing the first and second objects to translate along 3 orthogonal axis, the joint providing 6 degrees of freedom (DOF) between the first object and the second object in 3D space. In some implementations, at least one coupling point securing the first end to the deformable coupler and at least one coupling point securing the second end to the deformable coupler move in accordance with force generated upon movement of the character.

In some implementations, the joint is displayed during movement of the digital model of the character, wherein visible unique marking on ends of the first object and the second object near the deformable coupler show rotational movements of the first object and the second object.

In some implementations, the deformable coupler is compressible or expandable without a change in volume upon movement from rest by the first object or the second object. In some implementations, the deformable coupler without the change in volume includes material properties that are constant, include material properties that are variable by location, or dynamically temporal variable material properties.

In some implementations, the deformable coupler includes a volume change upon compression or expansion upon movement from rest by the first object or the second object. In some implementations, the volume change is an instantaneous volume loss or gain, a constant rate volume loss or gain, or a variable rate volume loss or gain upon movement from rest by the first object or the second object.

In some implementations, modular units are added to the joint, wherein each additional modular unit includes an additional joint and an additional object. In some implementations, a character includes N objects and M deformable couplers respectively representing connected joints in a joint chain of the character, wherein N and M are positive integers and N≥M, wherein the joint chain represents a portion of the skeleton of the character or animal, wherein movement of a first object is transferred to each object in the joint chain according to characteristics of the deformable couplers. In some implementations, at least two of the deformable couplers in the joint chain have different respective material characteristics. In some implementations, at least two of the deformable couplers in the joint chain have different respective DOF of movement of a rigid body in three-dimensional space. In some implementations, at least one of the objects in the joint chain has a higher positional priority.

In some implementations, the character is imaginary. In some implementations, the character is a jointed flying, arboreal, terrestrial, fossorial, or aquatic animal. In some implementations, the character is a jointed inanimate object.

In some implementations, compressibility or expansion of the deformable coupler in the joint is determined by machine learning using input character movement data. In some implementations, the compressibility of the deformable coupler is minimized without performing improper movements of the character when modeling the character movements using the input character movement data.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the disclosure are to be understood as being in every respect illustrative and exemplary, but not restrictive, and the scope of the disclosure disclosed herein is not to be determined only from the detailed description of illustrative implementations but according to the full breadth permitted by patent laws. It is to be understood that the implementations shown and described herein are only illustrative of the principles of the present disclosure and that various modification may be implemented by those skilled in the art without departing from the scope and spirit of the disclosure.

What is claimed is:

1. A non-transitory computer-readable storage medium, storing program instructions computer-executable on a computer to perform operations comprising:
    obtaining a model of a character comprising a joint that connects a first object to a second object, wherein:
        a first end of the first object connects to a surface of a deformable coupler such that the first object is capable of rotating relative to the second object; and
        a second end of the second object connects to the surface of the deformable coupler such that the second object is capable of rotating relative to the first object; and
    applying a motion to the model of the character, wherein applying the motion to the model of the character comprises deforming the deformable coupler to translate the first object with respect to the second object while allowing the first object and second object to rotate.

2. The non-transitory computer-readable storage medium of claim 1, wherein the first object is capable of rotating relative to the deformable coupler, and wherein the second object is capable of rotating relative to the deformable coupler.

3. The non-transitory computer-readable storage medium of claim 1, wherein the first object and the second object are bone-like structures or cylinders.

4. The non-transitory computer-readable storage medium of claim 1, wherein the deformable coupler is compressible.

5. The non-transitory computer-readable storage medium of claim 1, wherein the deformable coupler is expandable.

6. The non-transitory computer-readable storage medium of claim 1, wherein the operations further comprise associating a stiffness characteristic with the deformable coupler.

7. The non-transitory computer-readable storage medium of claim 1, wherein the operations further comprise displaying a sphere, wherein the displayed sphere represents the deformable coupler.

8. The non-transitory computer-readable storage medium of claim 1, wherein the operations further comprise:
    displaying the first end and the first object, wherein the first end further rotates relative to the first object;
    and displaying the second end and the second object, wherein the second end further rotates relative to the second object.

9. The non-transitory computer-readable storage medium of claim 1, wherein the deformable coupler changes size or shape in addition to providing a 6 degrees of freedom (DOF) connection to one of the first object and the second object in three-dimensional space.

10. The non-transitory computer-readable storage medium of claim 1, wherein the operations further comprise:
    receiving a restriction to implement less than a 6 DOF connection between the first object and the second object using the deformable coupler in the joint.

11. The non-transitory computer-readable storage medium of claim 1, wherein the operations further comprise:

displaying the joint during movement of the model of the character, wherein visible unique marking on ends of the first object and the second object near the deformable coupler show rotational movements of the first object and the second object relative to the deformable coupler.

12. The non-transitory computer-readable storage medium of claim 1, wherein the deformable coupler maintains a constant volume during compression and expansion.

13. The non-transitory computer-readable storage medium of claim 1, wherein a volume of the deformable coupler changes upon compression or expansion, wherein a rate of the volume change is variable or a non-linear.

14. The non-transitory computer-readable storage medium of claim 1, wherein at least one of the first object and the second object is compressible or expandable.

15. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining a model of a character comprising a joint that connects a first object to a second object, wherein:
a first end of the first object connects to a surface of a deformable coupler such that the first object is capable of rotating relative to the second object; and
a second end of the second object connects to the surface of the deformable coupler such that the second object is capable of rotating relative to the first object; and
applying a motion to the model of the character, wherein applying the motion to the model of the character comprises deforming the deformable coupler to translate the first object with respect to the second object while allowing the first object and second object to rotate.

16. The device of claim 15, wherein the deformable coupler changes size or shape in addition to providing a 6 degrees of freedom (DOF) connection to one of the first object and the second object in three-dimensional space.

17. The device of claim 15, wherein the operations further comprise associating a stiffness characteristic with the deformable coupler, wherein the deformable coupler maintains a constant volume during compression and expansion.

18. A method, comprising:
at an electronic device with a processor:
obtaining a model of a character comprising a joint that connects a first object to a second object, wherein:
a first end of the first object connects to a surface of a deformable coupler such that the first object is capable of rotating relative to the second object; and
a second end of the second object connects to the surface of the deformable coupler such that the second object is capable of rotating relative to the first object; and
applying a motion to the model of the character, wherein applying the motion to the model of the character comprises deforming the deformable coupler to translate the first object with respect to the second object while allowing the first object and second object to rotate.

19. The method of claim 18, wherein the deformable coupler changes size or shape in addition to providing a 6 degrees of freedom (DOF) connection to one of the first object and the second object in three-dimensional space.

20. The method of claim 18, further comprising associating a stiffness characteristic with the deformable coupler, wherein the deformable coupler maintains a constant volume during compression and expansion.

* * * * *